(12) United States Patent
Dartois

(10) Patent No.: US 7,142,828 B2
(45) Date of Patent: Nov. 28, 2006

(54) BASE STATION FOR A TELECOMMUNICATION SYSTEM

(75) Inventor: Luc Dartois, Carrieres Sous Poissy (FR)

(73) Assignee: Evolium S.A.S., Paris (FR)

( * ) Notice: Subject to any disclaimer, the term of this patent is extended or adjusted under 35 U.S.C. 154(b) by 152 days.

(21) Appl. No.: 10/501,095

(22) PCT Filed: Jan. 31, 2003

(86) PCT No.: PCT/FR03/00291

§ 371 (c)(1),
(2), (4) Date: Jul. 9, 2004

(87) PCT Pub. No.: WO03/065615

PCT Pub. Date: Aug. 7, 2003

(65) Prior Publication Data

US 2005/0107047 A1    May 19, 2005

(30) Foreign Application Priority Data

Jan. 31, 2002  (FR) ................................. 02 01143

(51) Int. Cl.
*H03C 7/02* (2006.01)
*H04B 1/02* (2006.01)
*H04B 7/02* (2006.01)

(52) U.S. Cl. .................. 455/101; 455/59; 455/103; 455/562.1; 370/335; 370/342; 370/441; 375/299

(58) Field of Classification Search ................ 455/101, 455/59, 103, 562.1; 370/525, 335, 342, 441; 375/299
See application file for complete search history.

(56) References Cited

U.S. PATENT DOCUMENTS 5,722,053 A * 2/1998 Kornfeld et al. ............... 455/86
6,005,876 A * 12/1999 Cimini et al. ................ 370/525
6,865,185 B1 * 3/2005 Patel et al. .................. 370/412

FOREIGN PATENT DOCUMENTS

EP        0 929 161 A2        7/1999

* cited by examiner

*Primary Examiner*—Quochien B. Vuong
*Assistant Examiner*—Tuan H. Nguyen
(74) *Attorney, Agent, or Firm*—Sughrue Mion, PLLC

(57) ABSTRACT

The invention concerns a unit for sending from a base station to terminals in a telecommunications system, said unit comprising at least two sending channels or groups of sending channels adapted to send on a plurality of adjacent carrier frequencies, said channels being able to send in spatial diversity mode so that the same information may be sent by the channels or groups of channels on the same carrier frequency or frequencies. In this unit the channels or groups of channels use at least one common carrier frequency for sending in spatial diversity mode and at least one of the channels or groups of channels comprises at least one different frequency for sending without spatial diversity or with a lower degree of spatial diversity.

9 Claims, 3 Drawing Sheets

BASE STATION FOR A TELECOMMUNICATION SYSTEM

The invention relates to a base station for a telecommunications system, in particular a system operating in accordance with the UMTS standard.

In a telecommunications system in which the terminals consist of mobiles, the area over which the system extends is divided into cells and a base station is provided in each cell. This is known in the art. Signals sent and received by a mobile pass in transit through the base station assigned to the cell in which the mobile is located.

The base stations are generally the most costly items in this kind of telecommunications system and the most costly component in a base station is the power amplifier, whose cost increases in proportion to the width of the band of frequencies that it must send. The wider the band of frequencies to be sent, the more difficult it becomes to ensure linearity over the whole of the band combined with maximum efficiency. This problem is particularly acute under the UMTS standard, which uses the wideband code division multiple access (WCDMA) technique in which codes are spread in frequency over a wide band, each modulated carrier has a bandwidth of 5 MHz, and the set of bands that may be assigned comprises twelve carriers and therefore spans 60 MHz.

Moreover, the cost of a base station may be further and significantly increased if it is necessary to provide for sending in spatial diversity mode, also under the UMTS standard. In the spatial diversity mode, the same information is sent twice on the same carrier frequency and one or more parameters are provided to differentiate the two radio signals sent and to prevent the undesirable effects of destructive combination of the radio signals. The two radio signals carrying the information may be distinguished by a time offset or an orthogonal relationship between the signals or by controlling their amplitude and phase differently, for example.

Sending in spatial diversity mode reduces the probability of transmission errors, especially under non-optimum propagation conditions. In particular, diversity is beneficial when the distance between the base station and the mobile is increasing, i.e. when the mobile is approaching the boundary of the cell, and/or when the signal-to-noise ratio or the signal-to-interference ratio necessary for correct reception is reduced, for example to send high bit rate data.

To enable sending in spatial diversity mode, two sending channels are provided in each base station, with a wideband amplifier and an antenna in each channel. Each of the two channels operates over the whole of the band assigned to the operator (or operators) using the channel, for example three or four adjacent frequencies each occupying a bandwith of 5 MHz.

Sending in spatial diversity mode therefore makes it obligatory to provide two sending channels.

The invention stems from the realization that spatial diversity is not needed all the time or for all mobiles, enabling the use of sending resources to be optimized.

The base station of the invention comprises, in a manner that is known in the art, at least two sending channels, each of which is able to send on a plurality of carrier frequencies, and is characterized in that the sending channels have at least one common frequency to enable the spatial diversity mode to be used for sending on the common frequency and at least one of the channels has at least one other frequency, different from the common frequency, for sending without using spatial diversity.

The two sending channels preferably send simultaneously on the same number of frequencies and preferably have the same maximum sending power and each is preferably configurable to send on frequencies that may be offset relative to the frequencies of the other channel.

It may be shown that if two sending channels are provided, each of which may send on two adjacent carrier frequencies, one of which is common to the two channels, the sending capacity is 10% to 20% greater than the capacity obtained with two sending channels comprising three adjacent common frequencies. Moreover, the constraints imposed on each sending channel are reduced when using the invention (in the example given here, two frequencies are used instead of three).

The technology of amplifiers for UMTS base stations is such that these amplifiers are able to process all twelve UMTS carriers but are able to process instantaneously only two, three or four adjacent carriers, corresponding to a bandwidth of 10 MHz to 20 MHz.

Thus the invention requires no change of technology, but instead programming two (or more) sending channels differently, compared to prior art base stations. It suffices to offset the frequencies of one sending channel relative to the frequencies of the other sending channel.

The invention also applies when at least two groups of sending channels are provided and all the channels in each group send in spatial diversity mode on at least one frequency that is assigned only to that group and at least one other sending frequency is assigned to all of the channels of both groups to enable extensive spatial diversity, i.e. spatial diversity for all sending channels of both groups. In this case, the sending frequency assigned to the two groups enables a higher degree of spatial diversity than the frequencies assigned to only one group.

The invention is generally concerned with a unit for sending from a base station to terminals in a telecommunications system, said unit comprising at least two sending channels or groups of sending channels adapted to send on a plurality of adjacent carrier frequencies, said channels being able to send in spatial diversity mode so that the same information may be sent by the channels or groups of channels on the same carrier frequency or frequencies.

In this unit the channels or groups of channels use at least one common carrier frequency for sending in spatial diversity mode and at least one of the channels or groups of channels comprises at least one different frequency for sending without spatial diversity or with a lower degree of spatial diversity.

In one embodiment, each of the channels or groups of channels uses at least one carrier frequency for sending without spatial diversity or with a lower degree of spatial diversity.

At least one of the sending channels preferably comprises a power amplifier able to send on a plurality of carrier frequencies and the active frequencies of which may be selected by programming them.

One embodiment of the unit comprises means for modifying the sending frequency during a call or during a standby period and for each of the terminals in the area covered by the station, from a first frequency with spatial diversity to a second frequency without spatial diversity or with a lower degree of spatial diversity than for the first frequency, and vice versa.

In this case, changing from a first frequency with spatial diversity to a second frequency without spatial diversity or with a lower degree of spatial diversity, or vice versa, may be effected as a function of at least one of the following parameters: the estimated position of the terminal relative to the base station, the bit rate of the call from the base station to the terminal, the level or quality of the signals received by the terminal, the power necessary for calling the terminal, and the class and grade of subscription of the terminal.

One embodiment of the unit comprises a device for assigning radio resources that is adapted to modify the sending frequency used for each call to a terminal.

The unit may further comprise two groups of channels where each group comprises at least one frequency used with spatial diversity only for that group and at least one other frequency used with spatial diversity for both groups.

The invention also consists in the application of a channel as defined hereinabove to a telecommunications system conforming to the UMTS, CDMA 2000, or DOCOMO standard.

The invention further consists in the application of a channel as defined hereinabove to a telecommunications system able to reassign frequencies during a call and/or in a standby mode of the terminals.

Other features and advantages of the invention will become apparent from the description of certain embodiments thereof given with reference to the appended drawings, in which.

Figure 3A:
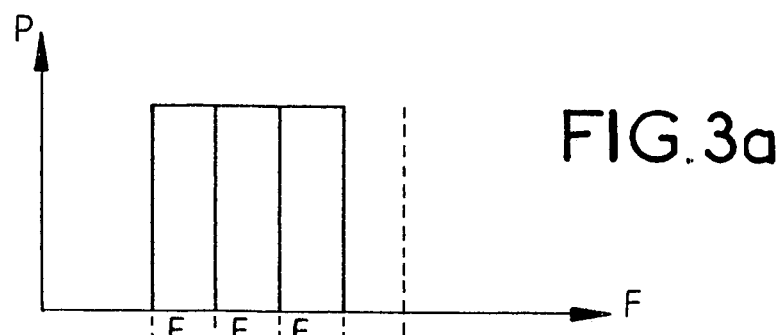
FIGS. 3a and 3b are diagrams analogous to those of FIGS. 2a and 2b but for a base station of the invention.
Figure 3B:
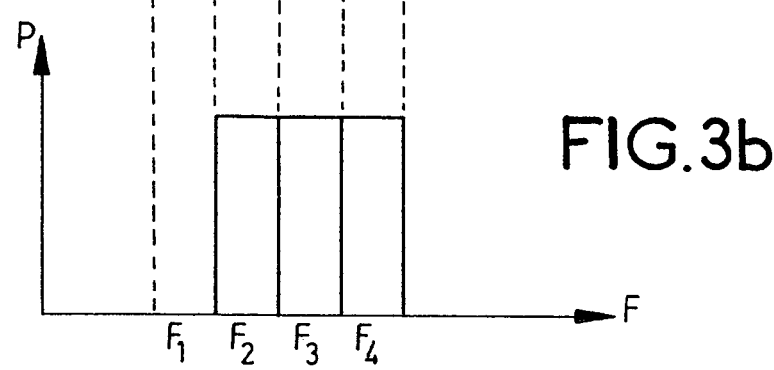
Figure 4A:
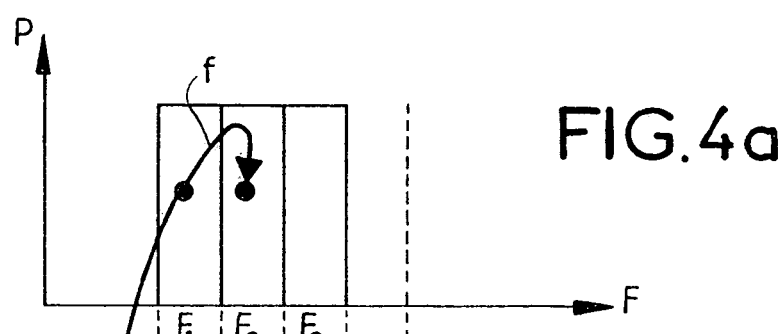
Figure 4B:
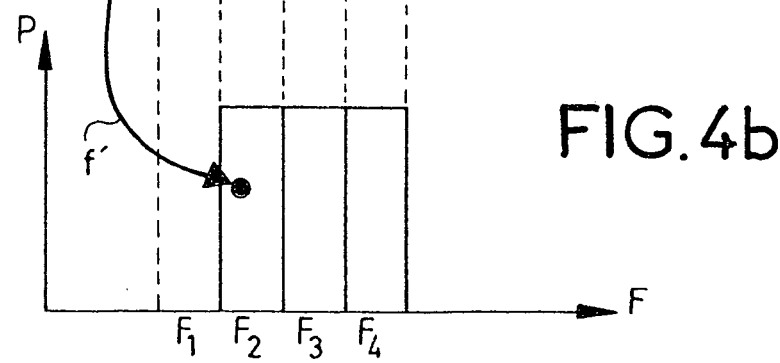
Figure 5A:
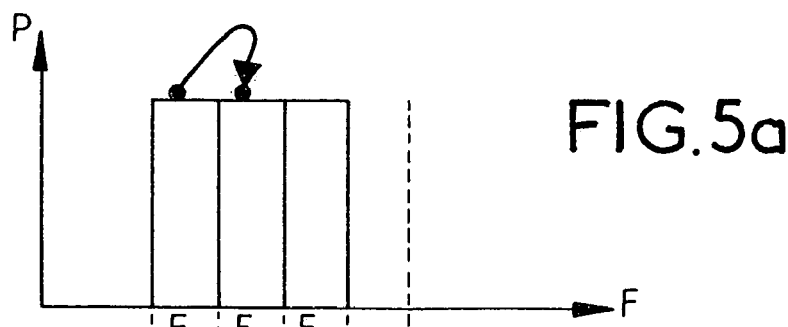
Figure 5B:
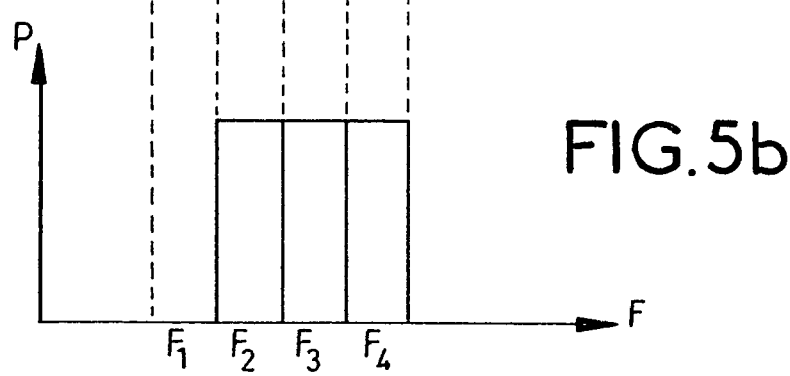
Figure 6A:
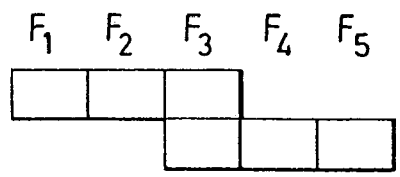
Figure 6B:
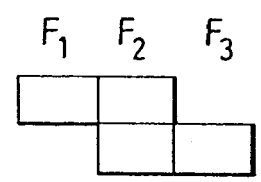
Figure 6C:
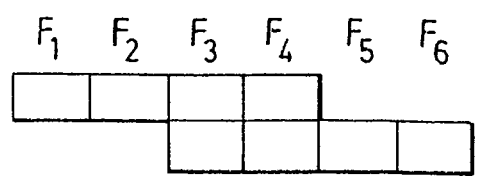

FIGS. 4a and 4b and 5a and 5b are diagrams analogous to those of FIGS. 3a and 3b showing certain properties of the base station of the invention; and FIGS. 6a, 6b and 6c are schematics showing variants of the invention.

Figure 1:
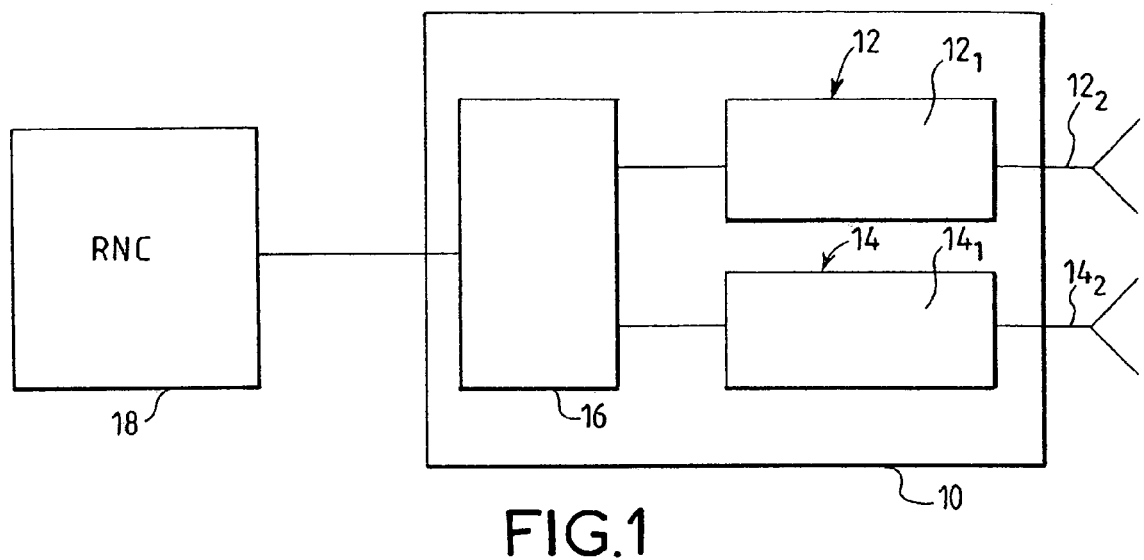
FIG. 1 is a schematic of a telecommunications channel in which a base station sends in spatial diversity mode.

In a UMTS telecommunications system the main components are the base stations, in particularly their sending part. Thus FIG. 1 represents the sending part 10 of a base station, which is referred to as a Node B in the UMTS standard, and which comprises two sending channels 12 and 14, each of which comprises a multi-carrier amplifier $12_1$ and $14_1$ and an antenna $12_2$ and $14_2$, respectively. The base station 10 also comprises a unit 16 controlled by a radio network controller (RNC) 18 and controlling the sending of signals and processing in the base band.

Figure 2A:
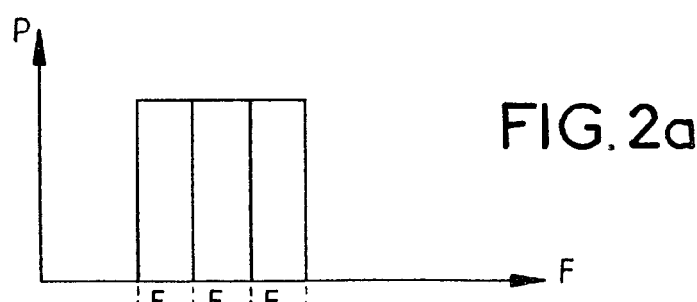
FIGS. 2a and 2b are diagrams showing properties of sending channels of a prior art base station.
Figure 2B:
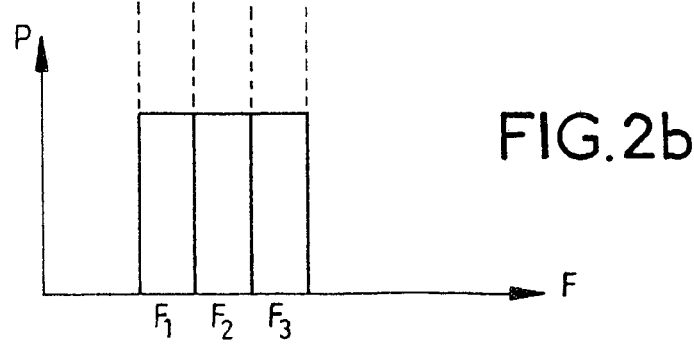

In the prior art, each channel 12 and 14 sends in the manner represented in FIGS. 2a and 2b, i.e. the two channels are identical and send at the same power on three adjacent frequencies $F_1$, $F_2$, and $F_3$ (for example) Thus the base station may send in diversity mode on each of the carrier frequencies $F_1$, $F_2$, and $F_3$.

The FIGS. 3a and 3b diagrams represent one example of the properties of a base station of the invention. This base station is the same as that represented in FIG. 1, i.e. it uses the same circuits (hardware), but is programmed differently. For example, the sending channel 12 sends on the same frequencies as in the prior art base station, i.e. on the frequencies $F_1$, $F_2$, and $F_3$. However, the sending channel 14 is programmed to send on the frequencies $F_2$, $F_3$, and $F_4$, the frequency $F_4$ being adjacent and higher than the frequency $F_3$. Under these conditions, the station may send in spatial diversity mode on the frequencies $F_2$ and $F_3$ and without using spatial diversity on the frequency $F_1$ on the channel 12 and the frequency $F_4$ on the channel 14.

The device 18 assigns radio resources, i.e. frequencies, in a novel manner. Accordingly, as represented in FIGS. 4a and 4b, if a mobile is close to the base station at the beginning of a call, the device 18 commands the base station to send on the frequency $F_1$ of the channel 12 without using spatial diversity. If the mobile (not shown) subsequently moves away from the base station toward the boundary of the corresponding cell, the device 18 modifies the frequency assigned, during the call, to enable sending in spatial diversity mode, i.e. sending on both channels 12 and 14. In this example, the frequency $F_1$ is dropped in favor of the frequency $F_2$ sent on the two channels 12 and 14. Changing from sending without diversity to sending with diversity is represented by the arrows f and f' in FIGS. 4a and 4b. Under the UMTS standard this is handled by the hard handover or interfrequency handover function.

FIGS. 5a and 5b depict the operation of the same base station when the mobile is ready to communicate. For example, if the mobile declares itself in the cell on the frequency $F_1$ and the mobile is close to the boundary of the cell, then the device 18 commands the base station to send from the base station to the mobile in spatial diversity mode. Thus sending to this mobile will not use the frequency $F_1$ but the frequency $F_2$ or $F_3$, which enables sending in spatial diversity mode.

In a similar way it is possible to modify the assignment of frequencies before or during a call in order to change from a frequency with spatial diversity to a frequency without spatial diversity. It is most important to note that the device 18 may change the frequency assigned to sending to each mobile independently, dynamically and in real time.

The examples referred to above allude primarily to the requirement for sending in spatial diversity mode when the mobile is moving away from the base station. However, changing between sending with and without spatial diversity may depend on other criteria. For example, a band of frequencies with spatial diversity is chosen if the information bit rate for sending to the mobile is high and a sending frequency that does not support spatial diversity may be chosen when the bit rate is low. The choice of sending with or without spatial diversity may also depend on such criteria as:

quality of service criteria negotiated at the start of a call, and algorithms for providing and balancing resources of the RNC 18, which may, for example, and depending on the requested range of bit rates, decide to assign the carriers with spatial diversity to all high bit rate mobiles and to assign the other carriers without spatial diversity to "standard" mobiles.

Nor is the invention limited to the situation described hereinabove in which each base station may send on three adjacent frequencies, two of which are common frequencies. Accordingly, as shown in FIG. 6a, the channel 12 sends on the frequencies $F_1$, $F_2$, and $F_3$ and the channel 14 sends on the frequencies $F_3$, $F_4$, and $F_5$, i.e. only the frequency $F_3$ is used for sending in spatial diversity mode and the frequencies $F_1$, $F_2$, $F_4$, and $F_5$ are used for sending without spatial diversity.

In the example represented in FIG. 6b, the channel 12 sends on the frequencies $F_1$ and $F_2$ and the channel 14 sends on the frequencies $F_2$ and $F_5$. Note that in this case the number of carriers per amplifier is lower and the power consumption per amplifier may therefore be reduced, because the linearization constraints are less severe. Moreover, as indicated hereinabove, capacity may be increased by approximately 10 to 20% relative to a telecommunications channel in which each sending channel uses three adjacent carrier frequencies.

In the example shown in FIG. 6c, the channel 12 sends on the frequencies $F_1$, $F_2$, $F_3$, and $F_4$ and the channel 14 sends on the frequencies $F_3$, $F_4$, $F_5$, and $F_6$. This configuration may be used when two operators share the same infrastructure, in particular the same base stations. For example, the first operator uses the frequencies $F_1$, $F_2$, and $F_3$ and the second operator uses the frequencies $F_4$, $F_5$, and $F_6$.

Thus an amplifier technology with four carriers and only two amplifiers provides a station serving two operators each with three carriers, each operator using spatial diversity on one of its carriers.

However, it is also possible for the operators to share their bands of frequencies.

The invention also applies when there are more than two sending channels, for example when using intelligent antennas. For example, eight channels may be provided, divided into two groups each of four channels, and the four channels in each group may use one (or more) spatial diversity frequencies for only these four channels and one (or more) spatial diversity frequencies for all eight channels. In other words, the invention applies generally to the situation in which more than one degree of spatial diversity is provided: a low degree of spatial diversity for only some of the channels and a high degree of spatial diversity for all the channels.

The invention claimed is:

1. An apparatus for sending from a base station to terminals in a telecommunications system, said apparatus comprising at least first and second sending channels or first and second groups of sending channels adapted to send on a plurality of adjacent carrier frequencies in spatial diversity mode so that the same information may be sent by the first and second sending channels or the first and second groups of sending channels on the same carrier frequency or frequencies, wherein the first sending channel or the first group of sending channels uses a first set of adjacent carrier frequencies, the second sending channel or the second group of sending channels uses a second set of adjacent carrier frequencies, each of the first and second sets of adjacent carrier frequencies includes at least one common carrier frequency for sending in spatial diversity mode, the first set of the adjacent carrier frequencies further includes at least one different carrier frequency for sending without spatial diversity or with a lower degree of spatial diversity, and the different carrier frequency is not included in the second set of adjacent carrier frequencies.

2. The apparatus according to claim 1, wherein each of the first and second sending channels or the first and second groups of sending channels uses at least one carrier frequency for sending without spatial diversity or with a lower degree of spatial diversity.

3. The apparatus according to claim 1, wherein at least one of the first and second sending channels comprises a power amplifier configured to send on the plurality of carrier frequencies, and active frequencies of the plurality of carrier frequencies are be selected by programming.

4. The apparatus according to claim 1, further comprising means for modifying a sending frequency during a call or during a standby period and for each of the terminals in the area covered by the station, from a first frequency with spatial diversity to a second frequency without spatial diversity or with a lower degree of spatial diversity than for the first frequency, and vice-versa.

5. The apparatus according to claim 4, wherein changing from a first frequency with spatial diversity to a second frequency without spatial diversity or with a lower degree of spatial diversity, or vice versa, is effected as a function of at least one of the following parameters: an estimated position of the terminal relative to the base station, a bit rate of a call from the base station to the terminal, a level or quality of reception of signals by the terminal, a power necessary for calling the terminal, and a class and type of subscription of the terminal.

6. The apparatus according to claim 4, further comprising a device for assigning radio resources adapted to modify the sending frequency used for each call to a terminal.

7. The apparatus according to claim 1, each of the first and second groups of sending channels and each group comprises uses at least one frequency used with spatial diversity only for that group and at least one other frequency used with spatial diversity for both groups.

8. Application of a channel according to claim 1 to a telecommunications system conforming to the UMTS, CDMA 2000, or DOCOMO standard.

9. Application of a channel according to claim 4 to a telecommunications system able to reassign frequencies during a call and/or in a standby mode of the terminals.

* * * * *